(12) United States Patent
Kim et al.

(10) Patent No.: US 9,252,428 B2
(45) Date of Patent: Feb. 2, 2016

(54) NEGATIVE ELECTRODE FOR RECHARGEABLE LITHIUM BATTERY, METHOD OF PREPARING THE SAME, AND RECHARGEABLE LITHIUM BATTERY INCLUDING THE SAME

(71) Applicant: SAMSUNG SDI CO., LTD., Yongin-si, Gyeonggi-do (KR)

(72) Inventors: Jae-Myung Kim, Yongin-si (KR); Kyu-Nam Joo, Yongin-si (KR); Soon-Sung Suh, Yongin-si (KR); Su-Kyung Lee, Yongin-si (KR); Deok-Hyun Kim, Yongin-si (KR); Yeon-Gap Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 511 days.

(21) Appl. No.: 13/675,314

(22) Filed: Nov. 13, 2012

(65) Prior Publication Data
US 2013/0288117 A1    Oct. 31, 2013

(30) Foreign Application Priority Data
Apr. 25, 2012    (KR) .................. 10-2012-0043358

(51) Int. Cl.
| | |
|---|---|
| H01M 4/587 | (2010.01) |
| H01M 4/64 | (2006.01) |
| C01B 31/00 | (2006.01) |
| H01M 4/04 | (2006.01) |
| H01M 4/133 | (2010.01) |
| H01M 4/1393 | (2010.01) |
| H01M 4/62 | (2006.01) |
| H01M 10/0525 | (2010.01) |

(52) U.S. Cl.
CPC ............... *H01M 4/587* (2013.01); *C01B 31/00* (2013.01); *H01M 4/043* (2013.01); *H01M 4/0404* (2013.01); *H01M 4/133* (2013.01); *H01M 4/1393* (2013.01); *H01M 4/62* (2013.01); *H01M 4/64* (2013.01); *H01M 10/0525* (2013.01); *Y02E 60/122* (2013.01)

(58) Field of Classification Search
CPC ....... H01M 4/587; H01M 4/64; H01M 4/043; H01M 4/133; H01M 4/0404; H01M 4/1393; H01M 4/62; H01M 10/0525; Y02E 60/122
See application file for complete search history.

(56) References Cited

FOREIGN PATENT DOCUMENTS

| | | |
|---|---|---|
| CN | 102237512 | * 11/2011 |
| JP | 2000-251890 | 9/2000 |
| JP | 2005-032571 | 2/2005 |
| JP | 2005-123175 | 5/2005 |
| JP | 2006-228640 | 8/2006 |
| KR | 10-2007-0090851 A | 9/2007 |

OTHER PUBLICATIONS

Full English Machine Translation of JP 2000-251890, 9 pages.
Full English Machine Translation of JP 2005-032571, 15 pages.
Full English Machine Translation of JP 2005-123175, 19 pages.
Full English Machine Translation of JP 2006-228640, 9 pages.

* cited by examiner

*Primary Examiner* — Laura Weiner
(74) *Attorney, Agent, or Firm* — Christie, Parker & Hale, LLP

(57) ABSTRACT

Disclosed is a negative electrode for a rechargeable lithium battery that includes a current collector and a negative active material layer on the current collector, the negative active material layer having an active mass density in a range of about 1.6 g/cc to about 2.1 g/cc and including graphite and a pore-forming agent.

6 Claims, 5 Drawing Sheets

NEGATIVE ELECTRODE FOR RECHARGEABLE LITHIUM BATTERY, METHOD OF PREPARING THE SAME, AND RECHARGEABLE LITHIUM BATTERY INCLUDING THE SAME

CROSS-REFERENCE TO RELATED APPLICATION

This application claims priority to and the benefit of Korean Patent Application No. 10-2012-0043358 filed in the Korean Intellectual Property Office on Apr. 25, 2012, the entire content of which is incorporated herein by reference.

BACKGROUND

1. Field

This disclosure relates to a negative electrode for a rechargeable lithium battery, a method of preparing the same, and a rechargeable lithium battery including the same.

2. Description of the Related Art

A rechargeable lithium battery has recently drawn attention as a power source for a small portable electronic device. It uses an organic electrolyte solution and thereby has twice or more the discharge voltage than that of a conventional battery using an alkali aqueous solution and as a result, has high energy density.

The rechargeable lithium battery is manufactured by injecting electrolyte into a battery cell, which includes a positive electrode including a positive active material capable of intercalating/deintercalating lithium and a negative electrode including a negative active material capable of intercalating/deintercalating lithium.

The negative electrode includes a current collector and a negative active material layer. The negative active material layer is formed by applying a negative active material slurry including the negative electrode active material, a binder, and a conductive material in a solvent on the current collector, followed by compression.

The negative active material layer is formed to have a high active mass density to increase energy density of the negative electrode. However, the negative active material layer with the high active mass density has no pores through which an electrolyte flows in, which deteriorates impregnation properties of the electrolyte into the negative active material layer.

SUMMARY

One embodiment of the present invention provides a negative electrode for a rechargeable lithium battery having a high active mass density and electrolyte impregnation properties.

Another embodiment provides a method of preparing the negative electrode for a rechargeable lithium battery.

Yet another embodiment provides a rechargeable lithium battery including the negative electrode for a rechargeable lithium battery.

According to one embodiment, a negative electrode for a rechargeable lithium battery includes a current collector and a negative active material layer on the current collector, the negative active material layer having an active mass density in a range of about 1.6 g/cc to about 2.1 g/cc and including graphite and a pore-forming agent.

The pore-forming agent may include a material having a decomposition temperature in a range of about 100° C. to about 14° C.

The pore-forming agent may include azodicarbonamide, azobisisobutyronitrile, dinitrosopentamethylene tetramine, paratoluene sulfonyl hydrazide, oxybisbenzene sulfonyl hydrazide, or a combination thereof.

The pore-forming agent may be included in an amount in a range of about 0.001 wt % to about 2 wt % based on the total amount of the negative active material layer.

The negative active material layer may have an active mass density in a range of about 1.8 g/cc to about 2.1 g/cc.

The negative active material layer may have a porosity ratio in a range of about 5% to about 20%.

A negative active material slurry according to another embodiment includes graphite and a pore-forming agent, wherein the pore-forming agent is included in an amount in a range of about 0.1 wt % to about 3 wt % based on the total amount of the negative active material slurry.

The pore-forming agent may include a material having a decomposition temperature in a range of about 100° C. to about 140° C.

The pore-forming agent may include azodicarbonamide, azobisisobutyronitrile, dinitrosopentamethylene tetramine, paratoluene sulfonyl hydrazide, oxybisbenzene sulfonyl hydrazide, or a combination thereof.

According to another embodiment, a method of preparing a negative electrode for a rechargeable lithium battery includes preparing a negative active material slurry including graphite and a pore-forming agent, applying the negative electrode active material slurry on a current collector to form a negative active material layer, compressing the negative active material layer, and drying the compressed negative active material layer, wherein drying the compressed negative active material layer decomposes the pore-forming agent.

The drying the compressed negative active material layer may be carried out at a temperature in a range of about 100° C. to about 140° C.

The pore-forming agent may include a material having a decomposition temperature in a range of about 100° C. to about 140° C.

The pore-forming agent may include azodicarbonamide, azobisisobutyronitrile, dinitrosopentamethylene tetramine, paratoluene sulfonyl hydrazide, oxybisbenzene sulfonyl hydrazide, or a combination thereof.

The method may further include pre-drying the applied negative active material layer before compressing the negative active material layer, and the applied negative active material layer may be pre-dried at a temperature in a range of about 60° C. to about 100° C.

The pore-forming agent may be included in an amount in a range of about 0.1 wt % to about 3 wt % based on the total amount of the negative active material slurry.

The compressed negative active material layer may have an active mass density in a range of about 1.6 g/cc to about 2.1 g/cc.

The compressed negative active material layer may have an active mass density in a range of about 1.8 g/cc to about 2.1 g/cc.

According to yet another embodiment, a rechargeable lithium battery including the negative electrode is provided.

Accordingly, the negative active material layer may secure electrolyte impregnation properties as well as have a high active mass density and thus, increase energy density of an electrode and simultaneously, improve cycle and cycle-life characteristics of a battery.

BRIEF DESCRIPTION OF THE DRAWINGS

The accompanying drawings, together with the specification, illustrate exemplary embodiments of the present invention, and, together with the description, serve to explain principles of the present invention.

DETAILED DESCRIPTION

Figure 1:
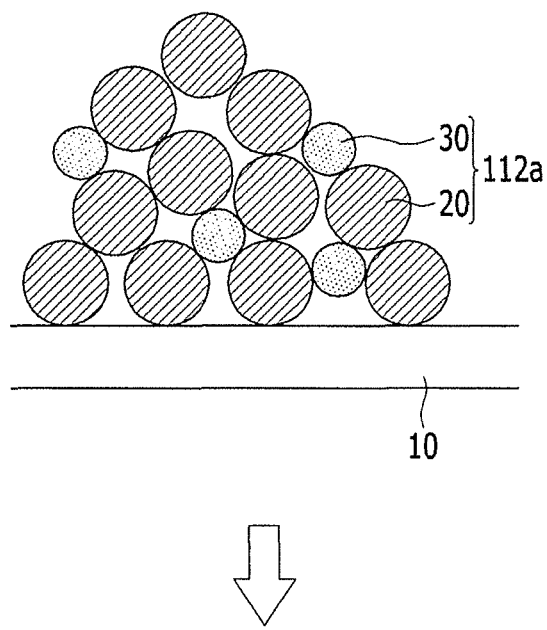
FIG. 1 is a schematic view of a negative electrode according to one embodiment.
Figure 1:
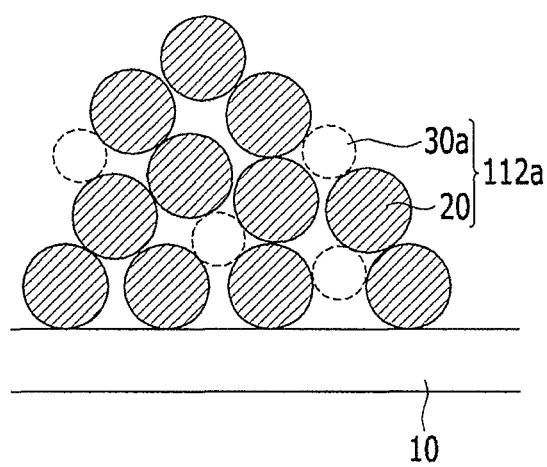

Exemplary embodiments of the present disclosure will hereinafter be described in detail with reference to the accompanying drawings. However, these embodiments are only exemplary, and this disclosure is not limited thereto. As those skilled in the art would realize, the described embodiments may be modified in various different ways, all without departing from the spirit or scope of the present invention. Like reference numerals designate like elements throughout the application.

The negative electrode according to one embodiment includes a current collector and a negative active material layer disposed on the current collector.

The current collector may be selected from the group consisting of a copper foil, a nickel foil, a stainless steel foil, a titanium foil, a nickel foam, a copper foam, a polymer substrate coated with a conductive metal, and combinations thereof, but is not limited thereto.

The negative active material layer may have an active mass density in a range of about 1.6 g/cc to about 2.1 g/cc, and specifically about 1.8 g/cc to about 2.1 g/cc. The negative active material layer having a high active mass density may increase the energy density of the negative electrode and thus, improve capacity characteristics.

In one embodiment, the negative active material layer includes graphite and a pore-forming agent.

The graphite is used as a negative electrode active material and may be a spherically shaped or fiber-shaped natural graphite or artificial graphite. Graphite has high capacity, small irreversible capacity, and an advantage in terms of a cost.

The pore-forming agent may be a solid or a liquid and is decomposed after the compression of the negative electrode and gasified and thus, forms pores in the negative active material layer.

Accordingly, the negative active material layer having a high active mass density may have a pore or pores after the compression process due to the pore-forming agent.

Referring FIG. 1, the negative electrode will be described.

FIG. 1 is a schematic view showing a negative electrode according to one embodiment.

Referring to FIG. 1, the negative electrode includes a current collector 10 and a negative active material layer 112a, and the negative active material layer 112a includes graphite 20 and a pore-forming agent 30.

The negative active material layer 112a may have a high active mass density ranging from about 1.6 g/cc to about 2.1 g/cc, and the pore-forming agent 30 is dispersed among graphite 20.

When the negative active material layer 112a is dried, especially, vacuum-dried at a predetermined (or preselected) temperature, the pore-forming agent 30 is decomposed and removed as gases, and a plurality of pores 30a may be formed where the pore-forming agent 30 was previously located. The pores 30a may provide space for electrolyte impregnation.

Accordingly, the negative active material layer 112a secures space for electrolyte impregnation as well as maintains high active mass density and thus, may increase energy density of an electrode and resultantly, capacity and simultaneously, improve cycle-life characteristics.

The pore-forming agent may be a material capable of being decomposed (e.g., have a decomposition temperature) at a temperature of drying, especially, vacuum-drying the negative active material layer, for example, at a temperature in a range of about 100° C. to about 140° C. Such a material may include, for example azodicarbonamide, azobisisobutyronitrile, dinitrosopentamethylene tetramine, paratoluene sulfonyl hydrazide, oxybisbenzene sulfonyl hydrazide, or a combination thereof.

The pore-forming agent is mostly decomposed in the drying step and may remain in a small amount in the negative active material layer. For example, after drying, the pore-forming agent may remain in the negative active material layer in an amount in a range of about 0.001 wt % to about 2 wt % based on the total amount of the negative active material layer.

The negative active material layer may have a porosity ratio of about 5% to about 20%. The porosity ratio is a ratio of a pore volume of the negative active material layer relative to the entire volume of the negative active material layer. When the negative active material layer has a porosity ratio within the above range, it may provide a passage for the electrolyte, increasing an electrolyte impregnation rate compared with a negative active material layer compressed without a pore-forming agent.

The negative active material layer may further include a binder, a conductive material, and/or a thickener.

The binder improves binding properties of the negative active material particles to one another and to a current collector. Examples of the binder may include, for example polyvinylalcohol, carboxylmethylcellulose, hydroxypropylcellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but the binder is not limited thereto.

The conductive material is used to improve conductivity of an electrode. Any suitable, electrically conductive material may be used as a conductive material unless it causes a chemical change. Examples of the conductive material include a carbon-based material such as natural graphite, artificial graphite, carbon black, acetylene black, ketjen black, a carbon fiber, and the like; a metal-based material such as a metal powder or a metal fiber including copper, nickel, aluminum, silver, and the like; a conductive polymer such as a polyphenylene derivative; or a mixture thereof, but the conductive material is not limited thereto.

The thickener is an additive for increasing viscosity of the negative active material slurry and includes, for example, carboxylmethyl cellulose (CMC) but it is not limited thereto.

Hereinafter, a method of fabricating the negative electrode according to an embodiment of the present invention is illustrated.

First, a negative active material slurry including the graphite and pore-forming agent is prepared.

The negative active material slurry may be prepared by mixing the graphite and pore-forming agent in a solvent, and, optionally, a binder, a conductive material and/or a thickener may be further included.

The graphite may be included in an amount in a range of about 40 wt % to about 60 wt % based on the total amount of the negative active material slurry.

The pore-forming agent may be included in an amount in a range of about 0.1 wt % to about 3 wt % based on the total amount of the negative active material slurry. When the pore-forming agent is included within the above range, it may reduce or minimize capacity deterioration and effectively play a role in passing the electrolyte for impregnation.

The binder, conductive material, and thickener may each be included in an amount in a range of about 0 wt % to about 3 wt %, and in one embodiment, may each be included in an amount in a range of about 0.01 to about 3 wt %. In another embodiment, the binder and the thickener may be each be included a in an amount in a range of about 1 wt % to about 3 wt %.

The solvent may include N-methylpyrrolidone, water, and the like, but it is not limited thereto.

Subsequently, the negative active material slurry is applied on the current collector to form a negative active material layer.

The negative active material layer may be pre-dried to remove a solvent therein. Herein, the pre-drying may be performed, for example, at a temperature in a range of about 60° C. to about 100° C.

Then, the negative active material layer is compressed. The compressing may be performed using, for example, a pressure roll and it may be adjusted to result in an active mass density in a range of about 1.6 g/cc to about 2.1 g/cc, and specifically about 1.8 g/cc to about 2.1 g/cc as aforementioned.

The compressed negative active material layer is dried. The dried negative active material layer may be vacuum-dried, for example, at a temperature in a range of about 100° C. to about 140° C. to completely remove a solvent therefrom.

In this step, the pore-forming agent is decomposed, thereby forming a plurality of pores in the negative active material layer. The pores may play a role in passing the electrolyte for impregnation.

Hereinafter, a rechargeable lithium battery including the negative electrode according to an embodiment of the present invention is described.

Figure 2:
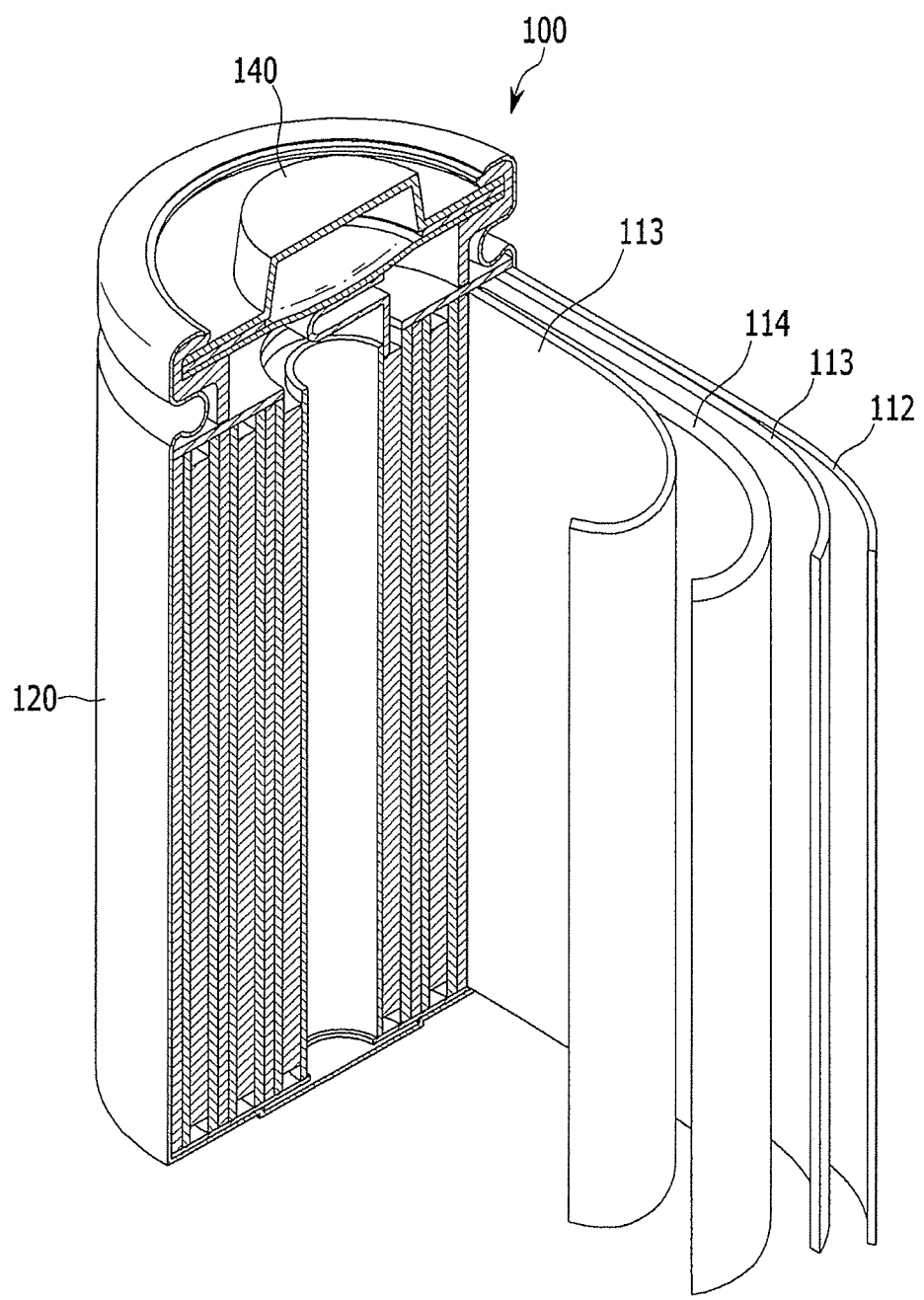
FIG. 2 is a schematic view of a rechargeable lithium battery according to one embodiment.

FIG. 2 is a schematic view of a rechargeable lithium battery according to one embodiment.

FIG. 2 illustrates a rechargeable lithium battery 100, which includes a negative electrode 112, a positive electrode 114 facing the negative electrode 112, a separator 113 interposed between the negative electrode 112 and the positive electrode 114, an electrolyte (not shown) impregnating the separator 113, a battery case 120, and a sealing member 140 sealing the battery case 120.

The negative electrode 112 is the same as the embodiment described above.

The positive electrode 114 includes a current collector and a positive active material layer on the current collector.

The current collector may be aluminum (Al), but is not limited thereto.

The positive active material layer includes a positive active material, a binder, and, optionally, a conductive material.

The positive active material includes lithiated intercalation compounds that reversibly intercalate and deintercalate lithium ions. The positive active material may include a composite oxide including at least one selected from the group consisting of cobalt, manganese, and nickel, as well as lithium. For example, the following lithium-containing compounds may be used:

$Li_aA_{1-b}R_bD_2$ ($0.90 \leq a \leq 1.8$ and $0 \leq b \leq 0.5$); $Li_aE_{1-b}R_bO_{2-c}D_c$ ($0.90 \leq a \leq 1.8$, $0 \leq b \leq 0.5$ and $0 \leq c \leq 0.05$); $LiE_{2-b}R_bO_{4-c}D_c$ ($0 \leq b \leq 0.5$, $0 \leq c \leq 0.05$); $Li_aNi_{1-b-c}Co_bR_cD_\alpha$ ($0.90 \leq a \leq 1.8$, $0 \leq b \leq 0.5$, $0 \leq c \leq 0.05$ and $0 < \alpha \leq 2$); $Li_aNi_{1-b-c}Co_bR_cO_{2-\alpha}Z_\alpha$ ($0.90 \leq a \leq 1.8$, $0 \leq b \leq 0.5$, $0 \leq c \leq 0.05$ and $0 < \alpha < 2$); $Li_aNi_{1-b-c}Co_bR_cO_{2-\alpha}Z_2$ ($0.90 \leq a \leq 1.8$, $0 \leq b \leq 0.5$, $0 \leq c \leq 0.05$ and $0 < \alpha < 2$); $Li_aNi_{1-b-c}Mn_bR_cD_\alpha$ ($0.90 \leq a \leq 1.8$, $0 \leq b \leq 0.5$, $0 \leq c \leq 0.05$ and $0 < \alpha \leq 2$); $Li_aNi_{1-b-c}Mn_bR_cO_{2-\alpha}Z_\alpha$ ($0.90 \leq a \leq 1.8$, $0 \leq b \leq 0.5$, $0 \leq c \leq 0.05$ and $0 < \alpha < 2$); $Li_aNi_{1-b-c}Mn_bR_cO_{2-\alpha}Z_2$ ($0.90 \leq a \leq 1.8$, $0 \leq b \leq 0.5$, $0 \leq c \leq 0.05$ and $0 < \alpha < 2$); $Li_aNi_bE_cG_dO_2$ ($0.90 \leq a \leq 1.8$, $0 \leq b \leq 0.9$, $0 \leq c \leq 0.5$ and $0.001 \leq d \leq 0.1$); $Li_aNi_bCo_cMn_dG_eO_2$ ($0.90 \leq a \leq 1.8$, $0 \leq b \leq 0.9$, $0 \leq c \leq 0.5$, $0 \leq d \leq 0.5$ and $0.001 \leq e \leq 0.1$); $Li_aNiG_bO_2$ ($0.90 \leq a \leq 1.8$ and $0.001 \leq b \leq 0.1$); $Li_aCoG_bO_2$ ($0.90 \leq a \leq 1.8$ and $0.001 \leq b \leq 0.1$); $Li_aMnG_bO_2$ ($0.90 \leq a \leq 1.8$ and $0.001 \leq b \leq 0.1$); $Li_aMn_2G_bO_4$ ($0.90 \leq a \leq 1.8$ and $0.001 \leq b \leq 0.1$); $QO_2$; $QS_2$; $LiQS_2$; $V_2O_5$; $LiV_2O_5$; $LiTO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$.

In the above chemical formulae, A is Ni, Co, Mn, or a combination thereof; R is Al, Ni, Co, Mn, Cr, Fe, Mg, Sr, V, a rare earth element, or a combination thereof; D is O, F, S, P, or a combination thereof; E is Co, Mn, or a combination thereof; Z is F, S, P, or a combination thereof; G is, Cr, Mn, Fe, Mg, La, Ce, Sr, V, or a combination thereof; Q is, Mo, Mn, or a combination thereof; T is V, Fe, Sc, Y, or a combination thereof; and J is V, Cr, Mn, Co, Ni, Cu, or a combination thereof.

The binder improves binding properties of the positive active material particles to each other and to a current collector. Examples of the binder include at least one selected from the group consisting of polyvinyl alcohol, carboxylmethyl cellulose, hydroxypropyl cellulose, diacetyl cellulose, polyvinylchloride, carboxylated polyvinyl chloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material is used in order to improve conductivity of an electrode. Any suitable electrically conductive material may be used as a conductive material unless it causes a chemical change. Examples of the conductive material include natural graphite, artificial graphite, carbon black, acetylene black, ketjen black, a carbon fiber, a metal powder or a metal fiber including copper, nickel, aluminum, silver, and so on, and a polyphenylene derivative.

The electrolyte includes a non-aqueous organic solvent and a lithium salt.

The non-aqueous organic solvent serves as a medium for transmitting ions taking part in the electrochemical reaction of the battery.

The non-aqueous organic solvent may include a carbonate-based, ester-based, ether-based, ketone-based, alcohol-based, or aprotic solvent. The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like, and the ester-based solvent may include methyl acetate, ethyl acetate, n-propyl acetate, 1,1-dimethylethyl acetate, methylpropionate, ethylpropionate, γ-butyrolactone, decanolide, valerolactone, mevalonolactone, caprolactone, and the like. The ether-based solvent includes dibutylether, tetraglyme, diglyme, dimethoxyethane, 2-methyltetrahydrofuran, tetrahydrofuran, and the like, and the ketone-based solvent includes cyclohexanone and the like. The alcohol-based solvent include ethyl alcohol, isopropyl alcohol, and the like, and the aprotic solvent may include nitriles of R—CN (R is a C2 to C20 linear, branched, or cyclic hydrocarbon group and may include a double bond, an aromatic ring, or an ether bond), amides such as dimethyl formamide, and the like, dioxolanes such as 1,3-dioxolane, and the like, sulfolanes, and the like.

The non-aqueous organic solvent may be used singularly or in a mixture. When the organic solvent is used in a mixture, the mixture ratio can be controlled in accordance with a desirable battery performance.

The carbonate-based solvent may include a mixture of a cyclic carbonate and a linear carbonate. The cyclic carbonate and the linear carbonate are mixed together at a volume ratio in a range of about 1:1 to about 1:9, and when the mixture is used as an electrolyte, the electrolyte performance may be enhanced.

In addition, the non-aqueous electrolyte may further include mixtures of carbonate-based solvents and aromatic hydrocarbon-based solvents. The carbonate-based solvents and the aromatic hydrocarbon-based solvents may be mixed together at a volume ratio of about 1:1 to about 30:1.

The aromatic hydrocarbon-based organic solvent may be represented by the following Chemical Formula 1.

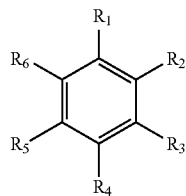

Chemical Formula 1

In Chemical Formula 1, $R_1$ to $R_6$ are each independently hydrogen, a halogen, a C1 to C10 alkyl group, a C1 to C10 haloalkyl group, or a combination thereof.

The aromatic hydrocarbon-based organic solvent may include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, or a combination thereof.

The non-aqueous electrolyte may further include vinylene carbonate or an ethylene carbonate-based compound of the following Chemical Formula 2 in order to improve cycle-life of a battery.

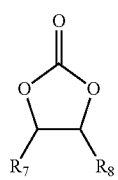

Chemical Formula 2

In Chemical Formula 2, $R_7$ and $R_8$ are each independently hydrogen, a halogen, a cyano group (CN), a nitro group ($NO_2$), or a C1 to C5 fluoroalkyl group, provided that at least one of $R_7$ and $R_8$ is a halogen, a cyano group (CN), a nitro group ($NO_2$), or a C1 to C5 fluoroalkyl group.

The ethylene carbonate-based compound includes difluoroethylene carbonate, chloroethylene carbonate, dichloroethylene carbonate, bromoethylene carbonate, dibromoethylene carbonate, nitroethylene carbonate, cyanoethylene carbonate, fluoroethylene carbonate, and the like. When the vinylene carbonate or the ethylene carbonate-based compound are further used, the amount used may be adjusted appropriately in order to improve cycle-life.

The lithium salt dissolved in an organic solvent supplies lithium ions in the battery, operates a basic operation of a rechargeable lithium battery, and improves lithium ion transport between positive and negative electrodes. Examples of the lithium salt include at least one supporting salt selected from $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers), LiCl, LiI and $LiB(C_2O_4)_2$ (lithium bisoxalate borate; LiBOB). The lithium salt may be used at a concentration in a range of 0.1 to 2.0 M. When the lithium salt is included in the above concentration range, electrolyte performance and lithium ion mobility may be enhanced due to optimal electrolyte conductivity and viscosity.

The separator 113 separates the negative electrode 112 and the positive electrode 114 and plays a role of a passage through which lithium ions move and may include any common separator used in a lithium battery. In other words, the separator may have low resistance for ion movement in an electrolyte but excellent moisture-absorbing capability for the electrolyte. For example, the separator may be selected from glass fiber, polyester, polyethylene, polypropylene, polytetrafluoroethylene (PTFE or TEFLON®), or a combination thereof and may be a non-woven fabric or a cloth. TEFLON® is a registered trademark of E.I. du Pont Nemours and Company, Wilmington, Del. For example, a lithium ion battery may include a polyolefin-based polymer separator such as polyethylene, polypropylene, and the like and a separator coated with a ceramic component or a polymer material to secure heat resistance or mechanical strength and may have optionally a single layer or multi-layers.

The following examples illustrate the present invention in more detail. These examples, however, should not in any sense be interpreted as limiting the scope of the present invention.

Fabrication of Negative Electrode

Example 1

97 wt % of graphite, 1 wt % of carboxylmethyl cellulose (a thickener), 1 wt % of styrene butadiene rubber (a binder), and 1 wt % of azodicarbonamide (a pore-forming agent) were mixed in water, preparing a negative active material slurry. At this time, the wt % is based on 100 wt % of the solid content of the slurry.

The azodicarbonamide was a yellow powder having a particle diameter of about 10 μm, eventually exhibited a decomposition temperature (a gasified temperature) in a range of 128° C. to 134° C., and eventually generated gas in a range of 170 cc/g to 180 cc/g during the decomposition.

Next, the negative active material slurry was coated on a copper foil in a slot die method to form a negative active material layer and primarily dried at 80° C.

The copper foil coated with the negative active material layer was compressed with a pressure roll. Herein, the pressure roll was adjusted to have a pressure density of about 1.9 g/cc.

Then, the compressed negative active material layer was secondarily dried at about 140° C. under vacuum conditions, fabricating a negative electrode.

Example 2

A negative electrode was fabricated according to the same method as Example 1 except for using azodicarbonamide contained in a white capsule, instead of the yellow powdered azodicarbonamide. The white capsule was made of an acryl component.

Comparative Example 1

A negative electrode was fabricated according to the same method as Example 1 except that it did not include azodicarbonamide.

Evaluation 1

Evaluation of Electrolyte Solution Impregnation Ratio

The negative electrodes according to Examples 1 and 2 and Comparative Example 1 were evaluated regarding electrolyte solution impregnation ratio.

Herein, the electrolyte solution included ethylenecarbonate (EC)/ethylmethylcarbonate(EMC)/dimethylcarbonate (DMC) in a volume ratio of 3/3/4 (v/v/v) and 1.15 M $LiPF_6$.

The impregnation was performed by two different methods.

In the first method, 2 mg of the electrolyte solution was dropped on the negative electrodes according to Examples 1 and 2 and Comparative Example 1 and the time until the electrolyte solution was completely absorbed was measured.

The results are provided in Table 1.

TABLE 1

| | Impregnation time (second) | Comparison of impregnation rate (ref = 100%) |
|---|---|---|
| Example 1 | 60 | 225% |
| Example 2 | 85 | 159% |
| Comparative Example 1 | 135 | 100% |

Referring to Table 1, the negative electrodes according to Examples 1 and 2 had a shorter impregnation time and, therefore, a faster impregnation rate, than the one according to Comparative Example 1.

In the second method, the negative electrodes according to Examples 1 and 2 and Comparative Example 1 were cut to be 2 cm wide and lightly dipped in an electrolyte solution, and the amount of the electrolyte solution absorbed therein was measured by weight. This evaluation was carried out using a Sigma 700.

Figure 3:
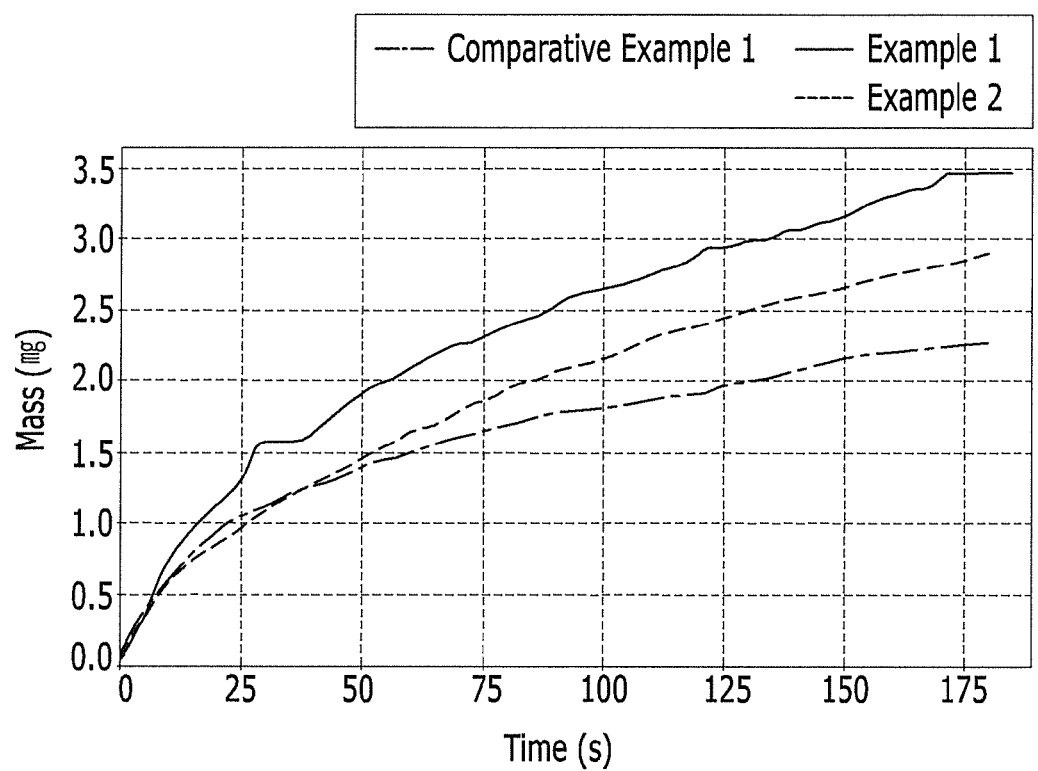
FIG. 3 is a graph showing the electrolyte impregnation results of the negative electrodes according to Examples 1 and 2 and Comparative Example 1.

The results are provided in Table 2 and FIG. 3.

FIG. 3 is a graph showing electrolyte solution impregnation results of the negative electrodes according to Examples 1 and 2 and Comparative Example 1 when impregnated with electrolyte solution according to the second method.

TABLE 2

| | Mass increase (mg) (150 sec) | Comparison of Impregnation rate (ref = 100%) |
|---|---|---|
| Example 1 | 3.2 | 145% |
| Example 2 | 2.7 | 123% |
| Comparative Example 1 | 2.2 | 100% |

Referring to Table 2 and FIG. 3, the negative electrodes according to Examples 1 and 2 each had a higher mass increase for a particular time than the electrode according to Comparative Example 1. Accordingly, the negative electrodes according to Examples 1 and 2 were impregnated more quickly in an electrolyte solution than the one according to Comparative Example 1.

Based on the results of these two experiments, when the negative active material slurry including a pore-forming agent was used to form a negative active material layer, a plurality of pores were formed therein, securing a passage for being impregnated in an electrolyte solution and increasing an impregnation rate in the electrolyte solution.

Evaluation 2

Porosity Ratio

The negative electrodes according to Examples 1 and 2 and Comparative Example 1 were evaluated regarding the diameter and the volume of pores in order to determine porosity ratio.

The diameter and the volume of pores were measured using mercury porosimetry.

Figure 4:
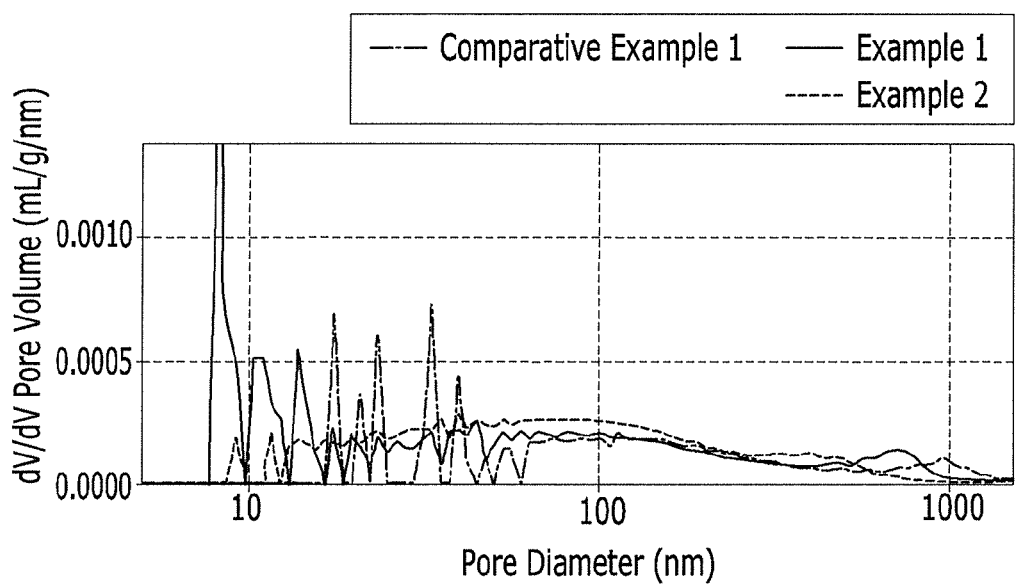
FIG. 4 is a graph showing the diameter and the volume of pores of the negative electrodes according to Examples 1 and 2 and Comparative Example 1.

The results are provided in FIG. 4.

Referring to FIG. 4, the negative electrodes according to Examples 1 and 2 had more nano-sized pores of about 10 nm than the one according to Comparative Example 1. These pores might improve electrolyte solution impregnation. It can be expected from FIG. 4 that the negative electrodes according to Examples 1 and 2 exhibits higher porosity ratio, rather than that of Comparative Example 1.

Fabrication of Rechargeable Lithium Battery Cell

Example 3

A coin-type half-cell was fabricated by using the negative electrode according to Example 1, metal lithium as a counter electrode, and an electrolyte solution prepared by mixing ethylenecarbonate (EC), ethylmethylcarbonate (EMC), and dimethylcarbonate (DMC) in a volume ratio of 3:3:4 and dissolving $LiPF_6$ to a concentration of 1.15 M therein.

Example 4

A coin-type half-cell was fabricated according to the same method as Example 3 except for using the negative electrode according to Example 2.

Comparative Example 2

A coin-type half-cell was fabricated according to the same method as Example 3 except for using the negative electrode according to Comparative Example 1.

Evaluation 3

Evaluation of Cell Characteristics

The half-cells according to Examples 3 and 4 and Comparative Example 2 were evaluated regarding cycle-life characteristic.

The cycle-life characteristic was evaluated by 120 cycles of charging and discharging the half-cells according to Examples 3 and 4 and Comparative Example 2 at 1C and checking their capacity retention rates.

Figure 5:
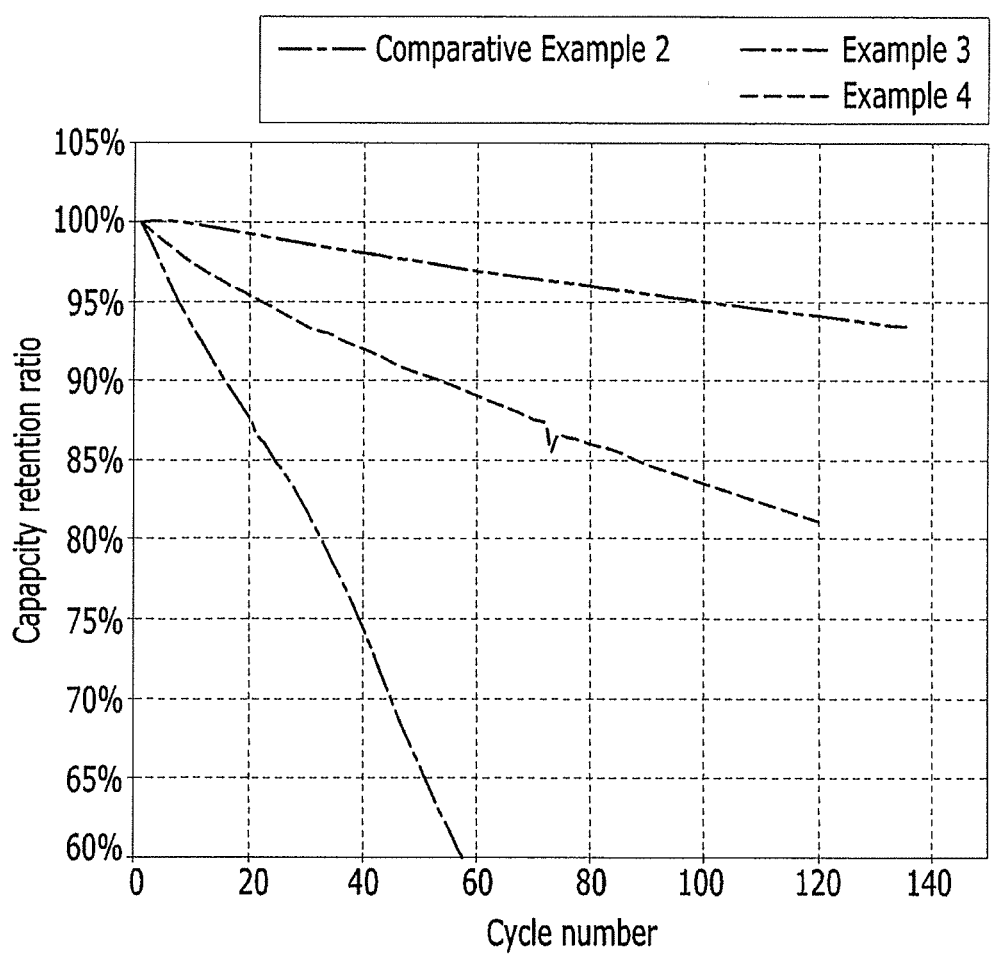
FIG. 5 is a graph showing cycle-life characteristics of the half-cells according to Examples 3 and 4 and Comparative Example 2.

FIG. 5 is a graph showing cycle-life characteristics of the half-cells according to Examples 3 and 4 and Comparative Example 2.

Referring to FIG. 5, the half-cells according to Examples 3 and 4 had greater than or equal to 80% of a capacity retention rate after being charged and discharged more than 100 times, while the half-cell according to Comparative Example 2 had greater than or equal to 60% of a capacity retention rate after being charged and discharged fewer than 60 times. Accordingly, the half-cells according to Examples 3 and 4 had improved cycle-life characteristics compared with the half-cell according to Comparative Example 2.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A negative electrode for a rechargeable lithium battery, comprising:
   a current collector; and
   a negative active material layer on the current collector, the negative active material layer having an active mass density in a range of about 1.6 g/cc to about 2.1 g/cc and comprising graphite and a pore-forming agent,
   wherein the pore-forming agent comprises a material having a decomposition temperature in a range of about 100° C. to about 140° C., and
   wherein the pore-forming agent comprises azodicarbonamide, azobisisobutyronitrile, dinitrosopentamethylene tetramine, paratoluene sulfonyl hydrazide, oxybisbenzene sulfonyl hydrazide, or a combination thereof.

2. The negative electrode for a rechargeable lithium battery of claim 1, wherein the pore-forming agent is included in an amount in a range of about 0.001 wt % to about 2 wt % based on the total amount of the negative active material layer.

3. The negative electrode for a rechargeable lithium battery of claim 1, wherein the negative active material layer has an active mass density in a range of about 1.8 g/cc to about 2.1 g/cc.

4. The negative electrode for a rechargeable lithium battery of claim 1, wherein the negative active material layer has a porosity ratio in a range of about 5 to about 20%.

5. A rechargeable lithium battery comprising the negative electrode according to claim 1.

6. The rechargeable lithium battery of claim 5, wherein the pore-forming agent is included in an amount of about 0.001 wt % to about 2 wt % based on the total amount of the negative active material layer.

* * * * *